(12) United States Patent
Chivers

(10) Patent No.: US 9,014,528 B1
(45) Date of Patent: Apr. 21, 2015

(54) METHOD AND APPARATUS FOR CALIBRATING THE APEX OFFSET ON FIBEROPTIC CONNECTOR MEASURING INTERFEROMETER

(71) Applicant: James T. Chivers, Largo, FL (US)

(72) Inventor: James T. Chivers, Largo, FL (US)

( * ) Notice: Subject to any disclaimer, the term of this patent is extended or adjusted under 35 U.S.C. 154(b) by 193 days.

(21) Appl. No.: 13/837,059

(22) Filed: Mar. 15, 2013

(51) Int. Cl.
*G02B 6/00* (2006.01)
*G01N 21/00* (2006.01)
*G01B 9/02* (2006.01)

(52) U.S. Cl.
CPC .................. *G01B 9/02055* (2013.01)

(58) Field of Classification Search
USPC ........................................ 385/136; 356/73.1
See application file for complete search history.

(56) References Cited

U.S. PATENT DOCUMENTS

2002/0197052 A1* 12/2002 Rogers et al. ................. 385/147

* cited by examiner

*Primary Examiner* — Jerry Blevins

(57) ABSTRACT

An interferometer for inspecting and evaluating the end surface of an optical cable with an optical fiber includes a reader, a chuck and a reference connector. The chuck is adapted to be removably received by the interferometer. The chuck removably receives the cable. The chuck includes a chuck tag in operative proximity to the reader. The reference connector is removably received by the chuck. A cable aperture in the reference connector is for receiving the cable. The reference connector includes a reference connector tag in operative proximity to the reader. The reader is adapted to read information on the chuck tag and reference connector tag in a single operation and automatically transfer all of the read information to perform apex offset calibration in the interferometer during a single measurement. The invention also includes a method of calibrating the apex offset on a fiberoptic connector measuring interferometer.

8 Claims, 3 Drawing Sheets

FIG. 1
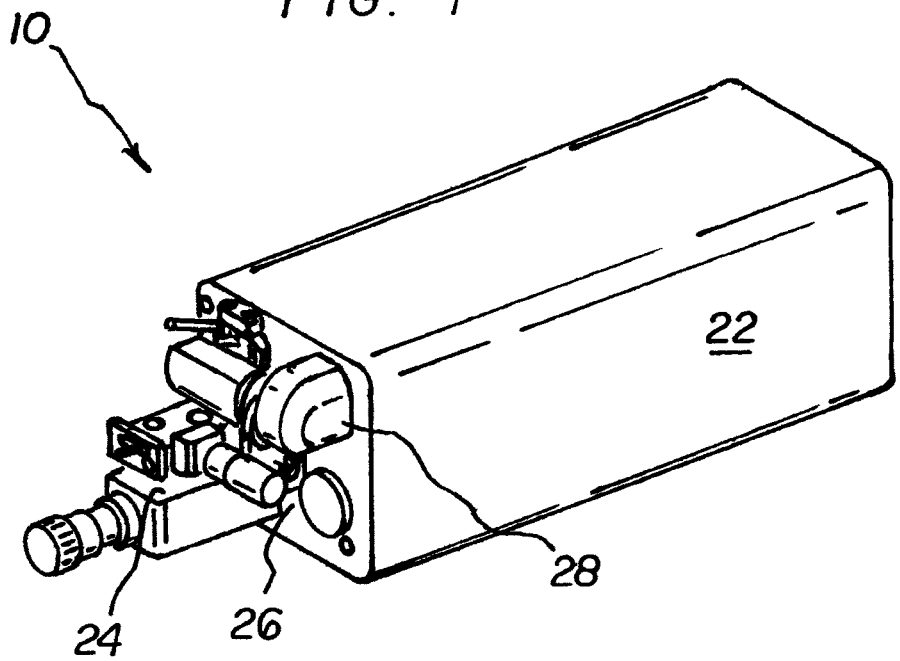
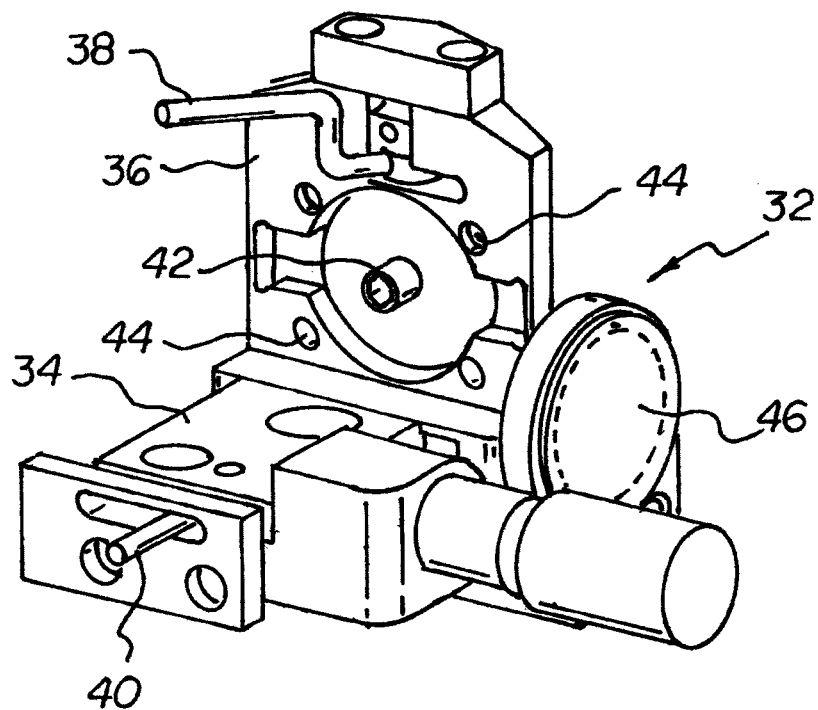
FIG. 2

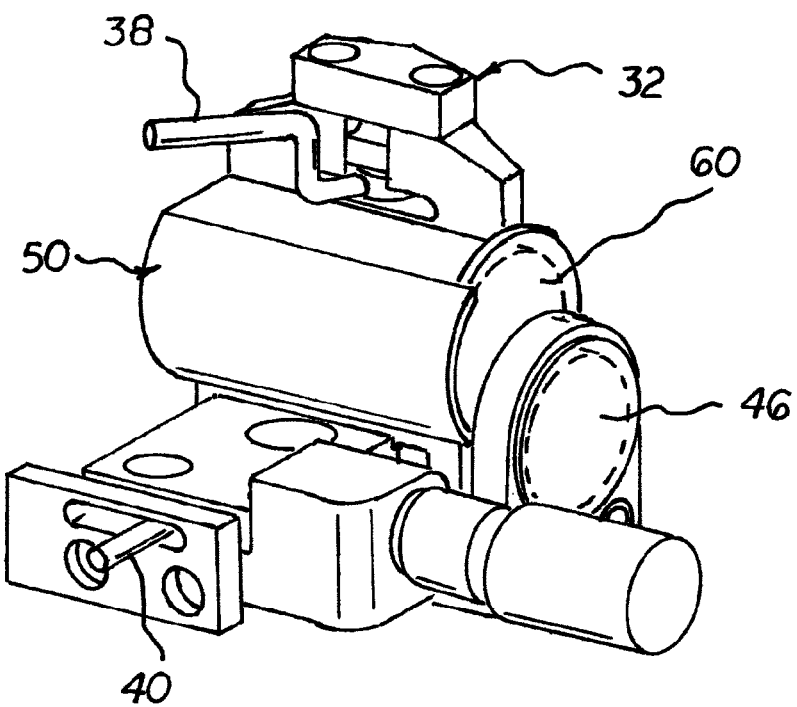
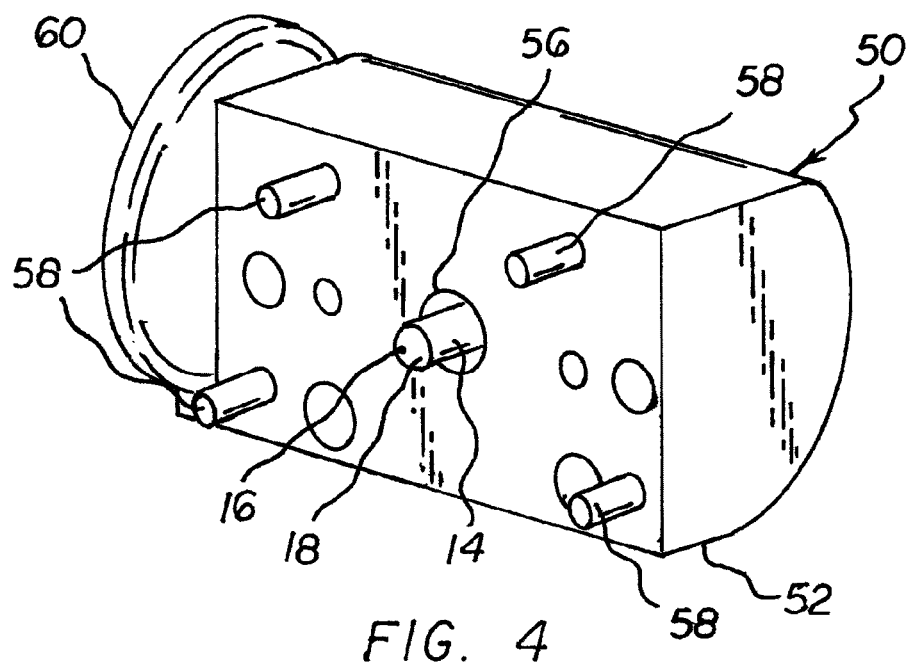

FIG. 5
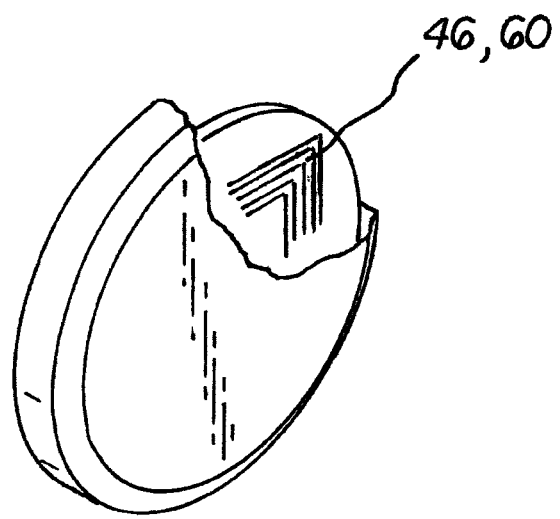
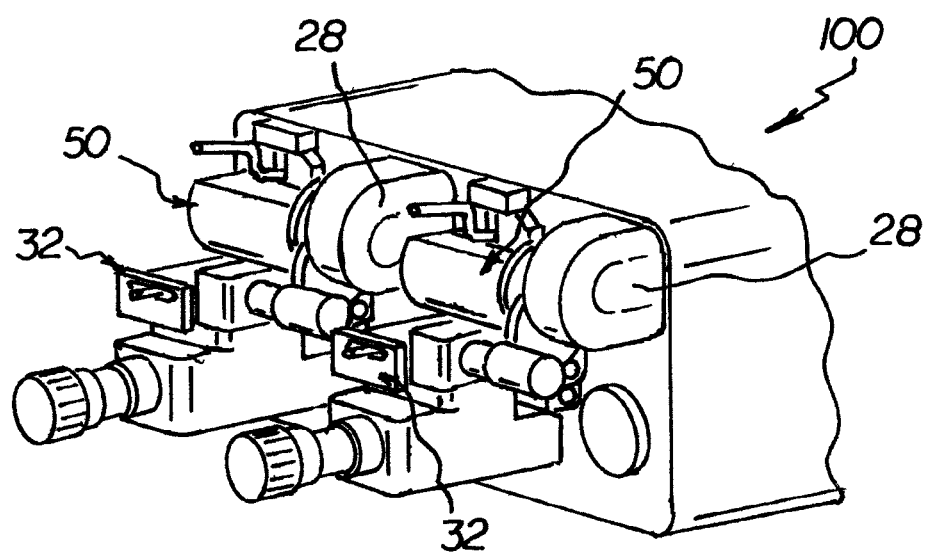
FIG. 6

METHOD AND APPARATUS FOR CALIBRATING THE APEX OFFSET ON FIBEROPTIC CONNECTOR MEASURING INTERFEROMETER

RELATED APPLICATION

The present application is an improvement over my prior patent application issued Oct. 17, 1995 as U.S. Pat. No. 5,459,564, the subject matter of which is incorporated herein by reference.

BACKGROUND OF THE INVENTION

1. Field of the Invention

The present invention relates to an improved method and apparatus for calibrating the apex offset on fiberoptic connector measuring interferometer and more particularly pertains to calibrating the apex offset on a fiberoptic connector measuring interferometer, the calibrating being done in an accurate, rapid, simple and economical manner.

2. Description of the Prior Art

Fiberoptic connectors are used around the world to construct networks that enable extremely fast, high bandwidth and reliable data communications. These connectors are an integral part of the network technology that enables the present day internet, cellular voice/data and phone service. Singlemode optical fibers, primarily used to carry this information efficiently, have extremely strict physical and optical parameters, since the portion of the fiber (fiber core) that actually carries the laser light is typically just 7-9 microns in diameter. At key points in the network fiberoptic connectors are used to attach transceivers, hubs, switches, amplifiers and a myriad of other optical components required to create the complete optical network. With such small diameters involved, it is clear that the physical parameters of the endface geometry are extremely strict to ensure intermatability of these connectors—at a common level of performance, from numerous vendors.

To ensure physical contact of the optical fibers, not only must they be aligned laterally to ensure the fiber cores mate with minimal (sub-micron) offset, minimizing insertion loss—but they must also mate in physical contact with each other to avoid changes in the index of refraction (such as an air gap), that can lead to a detrimental phenomenon known as back reflection. Both back reflection and insertion loss significantly detriment network performance and must be avoided at all cost. Strict manufacturing tolerances in both the ferrule and fiber are used to insure core alignment and thus minimal loss. To prevent back reflection that can destabilize the lasers generating the light transmitted in the fiber cores, physical contact (or angled physical contact) must be assured between the fibers of two mating connectors. This can be achieved by spherically polishing (or angled spherically polishing) the connector endfaces to a specific radius—and ensuring that the fiber does not protrude or become undercut, with respect to the ferrule surface, by more than approximately 100 nanometers. The apex is defined as the highest point on spherically polished ferrule, and ideally is coincident with the center of the fiber. Any deviation from the ideal is known as an apex offset. Typically, apex offset is expected to be less than just 50 microns. With expected geometry parameters of just a few microns or nanometers required to ensure optimal performance of the connectors, it becomes clear that measuring these parameters with sufficient accuracy and repeatability can be challenging.

Due to their inherent accuracy, interferometers have been the defacto standard for measuring the critical endface geometry parameters (Radius of curvature, Fiber Height, Apex Offset, Angle, Surface Roughness etc.) of fiber optic connectors after polishing, for over 20 years. To measure these parameters accurately—in particular the apex offset, it is essential that the fixture holding the connector during measurement be very accurately aligned with the interferometers optical axis or reference mirror. Small residual errors can be quantified and compensated for in software. Larger errors can be compensated for by physically realigning the fixture, the interferometers optical axis (or the interferometer itself) relative to each other. Either way, the resulting calibration will insure that the apex of a PC (Physical Contact) fiberoptic connector or the key error and angle of an APC (Angled Physical Contact) connector are measured accurately.

To achieve the correct calibration of the apex offset on a fiberoptic connector measuring interferometer, it is typically necessary to either rotate the connector multiple times—and fit a circle to the various apex offsets—or mechanically key a calibration connector, in a fixed rotational orientation—such that the magnitude and direction (bearing) of the calibration connectors apex offset is known, with respect to its "keyed" rotational orientation.

The multiple measurements at different points of rotation (typically 45-60 degrees) method is very accurate, requires no prior knowledge about the connector's apex offset or direction (bearing), and can provide additional information regarding the quality of the fixturing—however, it takes much longer than a single measurement.

The single measurement method is faster, however, it also requires physical input from the operator to provide the unique previously characterized magnitude and direction (bearing) information of the endface, relative to the keyed (known) mechanical rotational orientation. Any mistake or error in this inputted information would result in incorrect calibration and thus incorrect measurements—until the next "correct" calibration was performed. This could potentially result in a vendor shipping non-compliant products to a customer.

The use of methods and apparatuses for calibrating the apex offset on a fiberoptic connector measuring interferometer is known in the prior art. More specifically, methods and apparatuses for calibrating the apex offset on fiberoptic connector measuring interferometers of known designs and configurations previously devised and utilized are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe an improved method and apparatus for calibrating the apex offset on fiberoptic connector measuring interferometer that allows for calibrating the apex offset on a fiberoptic connector measuring interferometer, the calibrating being done in an accurate, rapid, simple and economical manner.

In this respect, the improved method and apparatus for calibrating the apex offset on fiberoptic connector measuring interferometer according to the present invention substantially departs from the conventional concepts and designs of the prior art, and in doing so provides an apparatus primarily developed for the purpose of calibrating the apex offset on a fiberoptic connector measuring interferometer, the calibrating being done in an accurate, rapid, simple and economical manner.

Therefore, it can be appreciated that there exists a continuing need for a new and improved method and apparatus for calibrating the apex offset on fiberoptic connector measuring interferometer which can be used for calibrating the apex offset on a fiberoptic connector measuring interferometer, the calibrating being done in an accurate, rapid, simple and economical manner. In this regard, the present invention substantially fulfills this need.

SUMMARY OF THE INVENTION

In view of the foregoing disadvantages inherent in the known types of methods and apparatuses for calibrating the apex offset on fiberoptic connector measuring interferometers of known designs and configurations now present in the prior art, the present invention provides an improved method and apparatus for calibrating the apex offset on fiberoptic connector measuring interferometer. As such, the general purpose of the present invention, which will be described subsequently in greater detail, is to provide a new and improved method and apparatus for calibrating the apex offset on fiberoptic connector measuring interferometer which has all the advantages of the prior art and none of the disadvantages.

To attain this, the present invention essentially comprises an improved method and apparatus for calibrating the apex offset on fiberoptic connector measuring interferometer. An interferometer for inspecting and evaluating the end surface of an optical cable with an optical fiber includes a reader, a chuck and a reference connector. The chuck is adapted to be removably received by the interferometer. The chuck removably receives the cable. The chuck includes a chuck tag in operative proximity to the reader. The reference connector is removably received by the chuck. A cable aperture in the reference connector is for receiving the cable. The reference connector includes a reference connector tag in operative proximity to the reader. The reader is adapted to read information on the chuck tag and reference connector tag in a single operation and automatically transfer all of the read information to perform apex offset calibration in the interferometer during a single measurement.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved method and apparatus for calibrating the apex offset on fiberoptic connector measuring interferometer which has all of the advantages of the prior art methods and apparatuses for calibrating the apex offset on fiberoptic connector measuring interferometers of known designs and configurations and none of the disadvantages.

It is another object of the present invention to provide a new and improved method and apparatus for calibrating the apex offset on fiberoptic connector measuring interferometer which may be easily and efficiently manufactured and marketed.

It is further object of the present invention to provide a new and improved method and apparatus for calibrating the apex offset on fiberoptic connector measuring interferometer which is of durable and reliable constructions.

An even further object of the present invention is to provide a new and improved method and apparatus for calibrating the apex offset on fiberoptic connector measuring interferometer which is susceptible of a low cost of manufacture with regard to both materials and labor, and which accordingly is then susceptible of low prices of sale to the consuming public, thereby making such improved method and apparatus for calibrating the apex offset on fiberoptic connector measuring interferometer economically available.

Lastly, it is an object of the present invention is to provide an improved method and apparatus for calibrating the apex offset on fiberoptic connector measuring interferometer for calibrating the apex offset on a fiberoptic connector measuring interferometer, the calibrating being done in an accurate, rapid, simple and economical manner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of an improved apparatus for calibrating the apex offset on fiberoptic connector measuring interferometer constructed in accordance with the principles of the present invention, the apparatus shown with a typical chuck holding a reference connector.

FIG. 2 is a perspective illustration of the chuck shown in FIG. 1, the chuck including a chuck tag.

FIG. 3 is a perspective illustration of the chuck shown in FIG. 1, the chuck holding a reference connector.

FIG. 4 is a perspective illustration of the reference connector shown in FIGS. 1 and 3, the chuck having a reference connector tag.

FIG. 5 is a perspective illustration of a tag with a tag cover, parts being broken away to show internal constructions.

FIG. 6 is a perspective illustration of a dual version of the interferometer which is simply two independent systems in a single housing.

DESCRIPTION OF THE PREFERRED EMBODIMENT

With reference now to the drawings, and in particular to FIG. 1 thereof, the preferred embodiment of the new and improved method and apparatus for calibrating the apex offset on fiberoptic connector measuring interferometer embodying the principles and concepts of the present invention and generally designated by the reference numeral 10 will be described.

The present invention, the improved method and apparatus for calibrating the apex offset on fiberoptic connector measuring interferometer 10 is comprised of a plurality of components. Such components in their broadest context include interferometer, chuck, and reference connector. Such components are individually configured and correlated with respect to each other so as to attain the desired objective.

First provided is an optical cable 14. The optical cable has an axial center with an optical fiber 16 adjacent to the axial center. The optical cable and optical fiber have an end surface 18 in a generally hemispherical configuration.

Next provided is an interferometer 22 for inspecting and evaluating the end surface of the optical cable. The interferometer has a horizontally oriented lower support surface 24 and a contiguous upstanding vertically oriented upper support surface 26. The interferometer has an RFID reader 28 extending laterally from the upper support surface and at an elevation above the lower support surface. A horizontal reader axis extends through the reader. A horizontal optical axis extends through the upper support surface.

A chuck 32 is next provided. The chuck has a horizontally oriented lower support surface 34 and a contiguous upstanding vertically oriented upper support surface 36. The lower support surface of the chuck is received upon the lower surface of the interferometer. The upper support surface of the chuck is received against the upper support surface of the interferometer. The chuck includes an upper lever 38 for releasably coupling the optical cable to the chuck. The chuck also includes a lower lever 40 for releasably coupling the chuck to the interferometer. The chuck further includes a ferrule 42 coaxial with the optical axis. A plurality of parallel positioning recesses 44 are formed in the chuck surrounding the ferrule. A chuck tag 46 is provided in a circular configuration with an axis parallel with the axis of the reader and extending through the reader. The chuck tag includes digital information relating to the serial number, type and capabilities of the chuck. The chuck tag is encased in a circular cover and is located in operative proximity to the reader for being read by the reader.

Lastly, a reference connector 50 is provided. The reference connector has a lower support surface 52 and a contiguous upstanding vertically oriented upper support surface 54. The lower support surface of the reference connector is received upon the lower support surface of the chuck. The upper support surface of the reference connector is received against the upper support surface of the chuck. A cable aperture 56 on the optical axis extends through the reference connector for receiving the ferrule with the cable. A plurality of positioning studs 58 parallel with and surrounding the cable aperture are for positing into the positioning recesses. The reference connector includes a reference connector tag 60 in a circular configuration with an axis parallel with the axis of the reader and extending through the reader. The reference connector tag includes digital information relating to the serial number, type and unique apex offset magnitude and direction/bearing of the reference connector. The chuck tag is encased in a circular cover and is located in operative proximity to the reader for being read by the reader. The reader is adapted to read the information on the chuck tag and reference connector tag in a single operation automatically and to transfer all of the information required to perform apex offset calibration in the interferometer during a single measurement.

In addition to the system as described above, the present invention also includes a method for calibrating the apex offset on a fiberoptic connector measuring interferometer with the system as described above. The method steps include:

providing an interferometer including a reader for inspecting and evaluating the end surface of an optical cable with an optical fiber;

providing a chuck adapted to be removably received by the interferometer, the chuck including a chuck tag in operative proximity to the reader;

providing a reference connector removably received by the chuck, the reference connector including a reference connector tag in operative proximity to the reader;

reading the information on the chuck tag and reference connector tag in a single operation;

automatically transferring all of the read information; and performing apex offset calibration in the interferometer during a single measurement.

FIG. 1 is an overall view of the interferometer with the RFID reader added and the fixture installed with its tag shown in green. The reference connector is also shown inserted into the fixture. It has a tag presented to the reader.

FIG. 2 is a typical fixture (chuck) used to hold the fiberoptic connectors in a fixed alignment with the respect to the optical axis of the interferometer—during the endface geometry measurement. The V.groove in the center is where the connector's ferrule is inserted. The chuck's tag is shown on the right hand side as a disk. The tag is programmed with the chucks serial number, type and capabilities. When it is installed on the interferometer the RFID reader reads this information—AUTOMATICALLY enabling menu's within the controlling software to become "context sensitive", based on the fixtures capabilities of the fixture.

FIG. 3 is the same fixture with the Reference Connector inserted into it—ready to calibrate the apex offset of the interferometer. Note that the tag on this connector is also now in range of the RFID reader. The tag is programmed with the Reference Connectors serial number, type and unique apex offset magnitude and direction (bearing). When it is installed on the interferometer the RFID reader reads this information—AUTOMATICALLY transferring all the information required to perform the apex offset calibration in a SINGLE measurement.

Note also the wide design of the Reference Connector—such that its lower flat surface mates with a similar flat surface on the fixture preventing rotation, and thereby creating the "known" orientation of the connector. This is the same orientation against which the apex offset magnitude and direction (bearing) were originally measured.

FIG. 4 is the Reference Connector itself in the preferred embodiment. The RFID tag is shown. The tag is programmed with the Reference Connectors serial number, type and unique apex offset magnitude and direction (bearing). When it is installed on the interferometer the RFID reader reads this information—AUTOMATICALLY transferring all the information required to perform the apex offset calibration in a SINGLE measurement.

Note also the wide design of the reference connector—such that it's lower flat surface mates with a similar flat surface on the fixture preventing rotation, and thereby creating the "known" orientation of the connector. This is the same orientation against which the apex offset magnitude and direction (bearing) were originally measured.

The spherically polished ferrule is shown in the center. The radius is exaggerated for clarity. The small circle in the center is the fiber—typically having a diameter of 125 um. The fiber is not required or used in this application. It's the endface of the polished zirconia ferrule that is important—in particular, its unique exact apex offset magnitude and direction (bearing).

Another feature of this connector is the inclusion of the 4 dowel pins. Although not required to perform the calibration, they do serve an important purpose. They extend out further than the endface of the ferrule and protect the delicate polished endface from coming into contact with the V.groove's perimeter during insertion into the fixture—potentially destroying the endface! The connector can ONLY be inserted when all 4 dowels line up with corresponding holes in the fixture. These holes are toleranced such that the ferrule will be centered within the V.groove before the connector is able to be pushed forward and seated in the chuck. It would also protect the ferrule endface in the event that the connector was accidentally dropped.

FIG. 6 is the dual version of the interferometer—it is simply 2 independent systems in a single housing.

The proposed method and apparatus is more accurate, immune to human error and can be used to perform the apex offset calibration accurately, automatically and at minimum, in a single measurement.

Disadvantages of the Prior Art "Single Measurement" Technique.
  a) Requires physical input from the operator regarding the actual magnitude and bearing of the apex offset relative to its mechanical orientation in the fixture. Human error can result in an incorrect calibration and incorrect future measurements until the next "correct" calibration is performed.

Advantages of the Present Invention a) More accurate—RFID tag transfers the exact apex offset magnitude and bearing automatically to the interferometer or its controlling software. No potential for human error.
  b) Faster—NO physical user input of information is required by the operator—the Reference Connector is automatically sensed by the interferometer, calibration parameters are automatically transferred to the interferometer or its controller using RFID, and a compensating measurement is automatically initiated. Complete and accurate calibration can be achieved in as little as 2 seconds from the moment the calibration connector is inserted. It is important to note that calibration is required frequently to accommodate small physical drifts in the mechanics of the interferometer and EVERY time a fixture is changed to measure a different type of connector. Over time, the amount of operator time spent calibrating a system can become significant—resulting in lost productivity.

Additional Advantages of the Present Invention a) RFID tags can also be fitted to the fixtures themselves allowing the interferometer or its controlling software to become aware of the operators intent. Menus can be truncated and become context sensitive and less complicated, depending on the fixture currently installed.
  b) RFID tags can be fitted to the tool used to change fixtures. Sensing of this tag can force the interferometer to automatically back the focus stage away from the microscope objective or beam splitter—potentially avoiding expensive damage occurring to these fragile optical surfaces while fixtures are changed.
  c) RFID tags can be presented to the reader to initiate measurements (ring tag), select Part ID's or otherwise configure or operate the interferometer.

In this invention, a prior art fiberoptic connector interferometer, such as the one described in U.S. Pat. No. 5,459,564 is additionally fitted with an RFID reader—ideally located in close or operative proximity to the interferometers fixtures—such that the range of the reader can reliably read the information stored in tags embedded in or on fixtures, calibration connectors, tools etc. commonly used to calibrate or operate the interferometer. Conversely, the range of the reader should be short enough, such that it cannot inadvertently read information on devices located outside the immediate vicinity of the interferometer. An example of this would be other fixtures, calibration connectors, tools etc. located nearby.

During normal operation of the interferometer it is frequently required to verify the apex offset calibration, either routinely or after changing fixtures to measure different types, diameters and styles of fiberoptic connectors. This calibration process can be performed by measuring a connector at multiple points of rotation and fitting a circle to the various apex locations and determining its center of rotation, relative to the center of the ferrule or fiber. The error is then compensated for either in software, or by physically changing the relative relationship of the fixture to the optical axis of the interferometer. This is typically a time consuming, 2-5 minutes, process that has to be performed frequently throughout the day. An alternate method involves just a single measurement taking just a few seconds, but requires that the connector be inserted in a known rotational orientation prior to measurement. It also requires prior knowledge of the specific connector's apex magnitude and direction (bearing), relative to the known rotational orientation when inserted in the fixture. This information is typically "typed" into the interferometer or its controller by the operator. Not only does this process offset some of the time gained by only requiring at least one measurement, but also opens the door to human error. In the event that the operator entered an incorrect string of numbers representing the magnitude and apex of the calibration connector, ALL future measurements would be incorrect until the next "correct" calibration was performed. This could potentially result in a vendor shipping non-compliant products to a customer. This is a serious problem as incorrectly polished fiberoptic connectors can be very detrimental to the performance of the fiberoptic networks they are installed in.

In the present invention, the possibility for human error in disseminating the calibration connectors unique apex offset parameters, relative to its physically keyed rotational orientation, to the interferometer or controller is mitigated by the use of an automated method of data transfer to disseminate this information. Each reference connector is physically embedded with a small transmitting device that relays the unique apex offset parameters to the interferometer or controller automatically. In the preferred embodiment, the connector being used for calibration is embedded with a small transmitting device that is coded with its unique apex offset magnitude and direction parameters, relative to its physically keyed rotational orientation, during manufacture. This information in conjunction with a physical key placing the connector in a known physical rotation can be used to calibrate the interferometer in, at minimum, a single measurement or even a single interferogram of the connector—faster than prior art methods and without the possibility of human error.

Once incorporated, the RFID tag system can offer many additional benefits to the system and its operation. For example, transponders can be added to the fixtures themselves, allowing software menus to become context sensitive based on the fixtures capability. Additionally, tags can be added to the tool used to change chucks. When the tool is inserted into the fixture to remove it, the focus stage could automatically retract away from the interferometer's optics—protecting their fragile glass surfaces from potential damage. Furthermore, tags could be attached to a ring worn by the operator and used to initiate measurements or other functionality of the interferometer.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An apparatus for calibrating the apex offset on a fiberoptic connector measuring interferometer comprising:
    an interferometer for inspecting and evaluating the end surface of an optical cable with an optical fiber, the interferometer including a reader;
    a chuck adapted to be removably received by the interferometer, the chuck removably receiving the cable, the chuck including a chuck tag in operative proximity to the reader; and
    a reference connector removably received by the chuck, a cable aperture in the reference connector for receiving the cable, the reference connector including a reference connector tag in operative proximity to the reader, the reader adapted to read information on the chuck tag and reference connector tag in a single operation and automatically transfer all of the read information to perform apex offset calibration in the interferometer during a single measurement.

2. The apparatus as set forth in claim 1 wherein the tags are programmable.

3. The apparatus as set forth in claim 1 wherein the tags are adapted to read and write.

4. The system as st forth in claim 1 wherein the information adapted to be read and transferred by the reader includes at least one interferogram.

5. The apparatus as set forth in claim 1 wherein the end surface is in an essentially hemispherical configuration.

6. The apparatus as set forth in claim 1 wherein the tags are in the shape of circular discs.

7. An apparatus (10) for calibrating the apex offset on a fiberoptic connector measuring interferometer, the calibrating being done in an accurate, rapid, simple and economical manner, the apparatus including, in combination:
    an optical cable (14) having an axial center with an optical fiber (16) adjacent to the axial center, the optical cable and optical fiber having an end surface (18) in a generally hemispherical configuration;
    an interferometer (22) for inspecting and evaluating the end surface of the optical cable, the interferometer having a horizontally oriented lower support surface (24) and a contiguous upstanding vertically oriented upper support surface (26), the interferometer having an RFID reader (28) extending laterally from the upper support surface and at an elevation above the lower support surface, a horizontal reader axis extending through the reader, a horizontal optical axis extending through the upper support surface;
    a chuck (32) having a horizontally oriented lower support surface (34) and a contiguous upstanding vertically oriented upper support surface (36), the lower support surface of the chuck being received upon the lower surface of the interferometer, the upper support surface of the chuck being received against the upper support surface of the interferometer, the chuck including an upper lever (38) for releasably coupling the optical cable to the chuck, the chuck including a lower lever (40) for releasably coupling the chuck to the interferometer, the chuck including a ferrule (42) coaxial with the optical axis, a plurality of parallel positioning recesses (44) formed in the chuck surrounding the ferrule, a chuck tag (46) in a circular configuration with an axis parallel with the axis of the reader and extending through the reader, the chuck tag including digital information relating to the serial number, type and capabilities of the chuck, the chuck tag being encased in a circular cover and located in operative proximity to the reader for being read by the reader; and
    a reference connector (50) having a lower support surface (52) and a contiguous upstanding vertically oriented upper support surface (54), the lower support surface of the reference connector being received upon the lower support surface of the chuck, the upper support surface of the reference connector being received against the upper support surface of the chuck, a cable aperture (56) on the optical axis extending through the reference connector for receiving the ferrule with the cable, a plurality of positioning studs (58) parallel with and surrounding the cable aperture for positing into the positioning recesses, the reference connector including a reference connector tag (60) in a circular configuration with an axis parallel with the axis of the reader and extending through the reader, the reference connector tag including digital information relating to the serial number, type and unique apex offset magnitude and direction/bearing of the reference connector, the chuck tag being encased in a circular cover and located in operative proximity to the reader for being read by the reader, the reader adapted to read the information on the chuck tag and reference connector tag in a single operation automatically and to transfer all of the information required to perform apex offset calibration in the interferometer during a single measurement.

8. A method for calibrating the apex offset on a fiberoptic connector measuring interferometer comprising:

providing an interferometer including a reader for inspecting and evaluating the end surface of an optical cable with an optical fiber;

providing a chuck adapted to be removably received by the interferometer, the chuck including a chuck tag in operative proximity to the reader;

providing a reference connector removably received by the chuck, the reference connector including a reference connector tag in operative proximity to the reader;

reading the information on the chuck tag and reference connector tag in a single operation;

automatically transferring all of the read information; and performing apex offset calibration in the interferometer during a single measurement.

* * * * *